United States Patent
Thuilliez et al.

(10) Patent No.: US 10,752,713 B2
(45) Date of Patent: Aug. 25, 2020

(54) MONOFUNCTIONAL OR TELECHELIC COPOLYMER OF 1,3-DIENE AND ETHYLENE OR ALPHA-MONOOLEFIN

(71) Applicant: COMPAGNIE GENERALE DES ETABLISSEMENTS MICHELIN, Clermont-Ferrand (FR)

(72) Inventors: Julien Thuilliez, Clermont-Ferrand (FR); Christophe Boisson, Tramoyes (FR); Franck D'Agosto, Genas (FR); Sébastien Norsic, Lyons (FR); Benoît Macqueron, Brive la Gaillarde (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 109 days.

(21) Appl. No.: 15/781,366

(22) PCT Filed: Dec. 7, 2016

(86) PCT No.: PCT/EP2016/080064
§ 371 (c)(1),
(2) Date: Jun. 4, 2018

(87) PCT Pub. No.: WO2017/097829
PCT Pub. Date: Jun. 15, 2017

(65) Prior Publication Data
US 2018/0362681 A1 Dec. 20, 2018

(30) Foreign Application Priority Data
Dec. 8, 2015 (FR) .................................. 15 62012

(51) Int. Cl.
| C08F 210/02 | (2006.01) |
| C08F 8/12   | (2006.01) |
| C08F 8/22   | (2006.01) |

(52) U.S. Cl.
CPC .............. *C08F 210/02* (2013.01); *C08F 8/12* (2013.01); *C08F 8/22* (2013.01); *C08F 2410/01* (2013.01); *C08F 2810/40* (2013.01)

(58) Field of Classification Search
CPC .. C08F 2810/40; C08F 210/02; C08F 210/06; C08F 210/08; C08F 210/10; C08F 210/14; C08F 236/04; C08F 236/045; C08F 236/06; C08F 236/08; C08F 216/12; C08F 226/02; C08F 210/12; C08F 8/30; C08F 8/42
See application file for complete search history.

(56) References Cited

U.S. PATENT DOCUMENTS

| 2005/0239639 A1 | 10/2005 | Monteil et al. |
| 2005/0272900 A1* | 12/2005 | Kuntimaddi ....... A63B 37/0003 528/44 |
| 2011/0028657 A1 | 2/2011 | Clark et al. |
| 2012/0135857 A1* | 5/2012 | Cortial ...................... C07F 3/02 502/154 |
| 2013/0274407 A1* | 10/2013 | Cortial ...................... C08F 4/50 524/571 |
| 2015/0038647 A1* | 2/2015 | Boisson ................... C08F 8/34 260/665 G |
| 2017/0362354 A1 | 12/2017 | Norsic et al. |

FOREIGN PATENT DOCUMENTS

| FR | 2987838 A1   |   | 9/2013  |
| JP | 2008-248203  | * | 10/2008 |
| JP | 2008248203 A |   | 10/2008 |
| WO | 2004035639 A1|   | 4/2004  |
| WO | 2010139449 A1|   | 12/2010 |
| WO | 2010139450 A1|   | 12/2010 |
| WO | 2016092227 A1|   | 6/2016  |

OTHER PUBLICATIONS

Translation of JP 2008-248203 (2008) (Year: 2008).*
Thomas Chenal et al: "End-capped Oligomers of Ethylene, Olefins and Dienes, by means of Coordinative Chain Transfer Polymerization using Rare Earth Catalysts" In: "Oligomerization of Chemical and Biological Compounds," Jun. 18, 2014 (Jun. 18, 2014), InTech, XP055293852, ISBN: 978-953-51-1617-2, DOI: 10.5772/58217, the whole locument.

* cited by examiner

*Primary Examiner* — Robert C Boyle
(74) *Attorney, Agent, or Firm* — Dickinson Wright PLLC

(57) ABSTRACT

A copolymer comprising a copolymer chain A bearing a function B selected from the group consisting of the functions B1 and B2, the copolymer chain A being a copolymer chain comprising monomer units M1 and monomer units M2, M1 being a conjugated diene and M2 being a monomer selected from the group consisting of α-monoolefins, ethylene and mixtures thereof, B1 being selected from the group consisting of $N(SiMe_3)_2$; $N(SiMe_2CH_2CH_2SiMe_2)$; para-$C_6H_4(NMe_2)$; para-$C_6H_4(OMe)$; para-$C_6H_4(N(SiMe_3)_2)$; ortho-$CH_2$-$C_6H_4NMe_2$; ortho-$CH_2$-$C_6H_4OMe$; $C_6F_5$; $C_3F_7$; $C_6F_{13}$; $CH(OCH_2CH_2O)$; B2 being a function that is derived from B1, is provided. Such a copolymer is synthesized by using a transfer agent bearing the function B1 and a carbon-metal bond, the metal being an alkaline-earth metal, zinc or aluminium.

13 Claims, No Drawings

MONOFUNCTIONAL OR TELECHELIC COPOLYMER OF 1,3-DIENE AND ETHYLENE OR ALPHA-MONOOLEFIN

This application is a 371 national phase entry of PCT/EP2016/080064 filed on 7 Dec. 2016, which claims benefit of French Patent Application No. 1562012, filed 8 Dec. 2015, the entire contents of which are incorporated herein by reference for all purposes.

BACKGROUND

1. Technical Field

The present invention relates to conjugated diene/monoolefin copolymers, which copolymer bears at least one functional group and to the process for the preparation thereof.

2. Related Art

It is always advantageous to have new polymers available in order to broaden the range of materials already available and to improve the functionalities of already existing materials. Generally, the development of new polymers is motivated in order to improve the performance of already existing materials.

Among the approaches to new polymers, mention may be made of the modification of polymers that are already known. The modification of polymers that are already known may consist of a post-polymerization modification, which modification takes place on the polymer previously synthesized, such as for example the hydrogenation reaction or the grafting of a function along the polymer chain, of the copolymerization of a functional monomer, of the use of a functionalizing agent in the polymer chain termination reaction or in the polymer chain initiation reaction.

The applicant companies have already developed the synthesis of conjugated diene/monoolefin copolymers, described for example in patent applications EP 1 092 731, WO 2004035639, WO 2005028526, WO 2007054223 and WO 2007054224. In their efforts to modify the properties of these copolymers, the applicant companies have discovered a new process that makes it possible to provide at least one function to these copolymers and to thus gain access to the synthesis of new copolymers. This process, which uses a functional transfer agent, enables not only the synthesis of a conjugated diene/monoolefin copolymer, which copolymer bears a function on one end of the copolymer chain, but also opens the way to the synthesis of telechelic or heterotelechelic conjugated diene/monoolefin copolymers.

SUMMARY

Thus, a first subject of the invention is a copolymer comprising a copolymer chain A bearing a function B selected from the group consisting of the functions B1 and B2, the copolymer chain A being a copolymer chain comprising monomer units M1 and monomer units M2, M1 being a conjugated diene and M2 being a monomer selected from the group consisting of α-monoolefins, ethylene and mixtures thereof, B1 being selected from the group consisting of $N(SiMe_3)_2$; $N(SiMe_2CH_2CH_2SiMe_2)$; para-$C_6H_4(NMe_2)$; para-$C_6H_4(OMe)$; para-$C_6H_4(N(SiMe_3)_2)$; ortho-$CH_2$—$C_6H_4NMe_2$; ortho-$CH_2$—$C_6H_4OMe$; $C_6F_5$; $C_3F_7$; $C_6F_{13}$; $CH(OCH_2CH_2O)$;

B2 being a function that is derived from B1.

Another subject of the invention is a process for preparing the copolymer in accordance with the invention.

Another subject of the invention is the use of a transfer agent of formula (III) in the synthesis of a copolymer in accordance with the invention, $$Y((CH_2)_d B1)_y \qquad (III)$$

y being equal to 2 or 3;
when y=2, the symbol Y being an alkaline-earth metal or zinc, and when y=3, Y being aluminium;
d being an integer from 0 to 50, advantageously from 0 to 11;
B1 being selected from the group consisting of $N(SiMe_3)_2$; $N(SiMe_2CH_2CH_2SiMe_2)$; para-$C_6H_4(NMe_2)$; para-$C_6H_4(OMe)$; para-$C_6H_4(N(SiMe_3)_2)$; ortho-$CH_2$—$C_6H_4NMe_2$; ortho-$CH_2$—$C_6H_4OMe$; $C_6F_5$; $C_3F_7$; $C_6F_{13}$; $CH(OCH_2CH_2O)$.

The invention also relates to a compound of formula (II), an intermediate compound in the synthesis of the copolymer in accordance with the invention, $$Y(A-(CH_2)_d-B1)_y \qquad (II)$$

in which Y, d, y, A and B1 are as defined above.

The invention also relates to a rubber composition comprising the copolymer in accordance with the invention.

DETAILED DESCRIPTION OF EXAMPLE EMBODIMENTS

Any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The expression "composition based on" should be understood as meaning, in the present description, a composition comprising the mixture and/or the in situ reaction product of the various constituents used, some of these base constituents (for example the elastomer, the filler or other additive conventionally used in a rubber composition intended for the manufacture of tires) being capable of reacting or intended to react with one another, at least in part, during the various phases of manufacture of the composition intended for the manufacture of tires.

The copolymer in accordance with embodiments of the invention has the essential feature of comprising a copolymer chain A. The copolymer chain A comprises monomer units M1 and monomer units M2, M1 being a conjugated diene and M2 being a monomer selected from the group consisting of α-monoolefins, ethylene and mixtures thereof. By definition, the respective molar percentage of the monomer units M1 and of the monomer units M2 in the copolymer chain A is strictly greater than 0.

The monomer units M1 result from the insertion of the monomer M1, a conjugated diene, into the growing copolymer chain A, in particular by a 1,2 or 1,4 addition. "A" conjugated diene is understood to mean one or more conjugated dienes. In the case where M1 represents a mixture of conjugated dienes, the monomer units M1 denote the monomer units resulting from the insertion of each of the conjugated dienes.

The monomer units M2 result from the insertion of the monomer M2 into the growing copolymer chain A, M2 preferably being ethylene or a mixture of monomers of an α-monoolefin and of ethylene. "An" α-monoolefin is understood to mean one or more α-monoolefins. In the case where M2 represents a monomer mixture, that is to say a mixture of several monomers, the monomer units M2 denote the monomer units resulting from the insertion of each of the monomers of the monomer mixture.

As conjugated diene, mention may be made of 1,3-dienes, particularly a conjugated diene selected from the group consisting of 1,3-butadiene, isoprene and a mixture thereof. Preferably M1 is 1,3-butadiene.

As α-monoolefin, aliphatic or aromatic α-monoolefins, particularly aliphatic α-monoolefins preferably having 3 to 18 carbon atoms such as propene, 1-butene, 1-hexene, 1-octene, 1-hexadecene or mixtures thereof, are suitable.

According to one embodiment of the invention, the monomer units M1 represent more than 40 mol %, preferentially more than 60 mol % of the monomer units of the copolymer.

According to another embodiment of the invention, the monomer units M1 represent less than 35 mol % of the monomer units of the copolymer.

According to a particular embodiment of the invention, the ethylene units represent more than 50 mol %, preferentially more than 65 mol % of the monomer units of the copolymer.

According to one preferred embodiment of the invention, the monomer units M1 contain more than 80 mol % of a moiety resulting from a trans-1,4 insertion of M1 into the copolymer chain.

According to any one of the embodiments of the invention, the copolymer preferably contains less than 0.5 mol % of aliphatic hydrocarbon-based cyclic moieties, more preferentially is free of such moieties, the cyclic moiety containing a ring with 5 or 6 carbon atoms.

According to one advantageous embodiment of the invention, the copolymer in accordance with the invention is a copolymer of M1 and M2, in particular a copolymer of 1,3-butadiene and ethylene or a terpolymer of 1,3-butadiene, ethylene and an α-monoolefin as defined above.

According to any one of the embodiments of the invention, the copolymer preferably has a number-average molar mass (Mn) of at least 5000 g/mol, more preferentially of at least 60 000 g/mol, minimum value particularly advantageous for a use of the copolymer as an elastomer for example in a rubber composition for a tire. Generally, its number-average molar mass does not exceed 1 500 000 g/mol; beyond this value, the viscosity of the copolymer may make the use of the copolymer difficult. It preferably has a polydispersity index Đ, equal to Mw/Mn (Mw being the weight-average molar mass), of between 1.20 and 3.00. The Mn, Mw and Đ values are measured according to the method described in section II.1.

The copolymer chain A has another essential feature of bearing a function B. The function B may be attached to the copolymer chain directly by a covalent bond or via a divalent group of formula (I):

—(CH$_2$)$_w$—     (I)

wherein w is an integer from 1 to 50, preferentially from 1 to 11. Advantageously, w is equal to 3.

Preferably, the function B is borne at the end of the copolymer chain A.

The function B is selected from the group consisting of the functions B1 and B2. B1 is selected from the group consisting of N(SiMe$_3$)$_2$; N(SiMe$_2$CH$_2$CH$_2$SiMe$_2$); para-C$_6$H$_4$(NMe$_2$); para-C$_6$H$_4$(OMe); para-C$_6$H$_4$(N(SiMe$_3$)$_2$); ortho-CH$_2$—C$_6$H$_4$NMe$_2$; ortho-CH$_2$—C$_6$H$_4$OMe; C$_6$F$_5$; C$_3$F$_7$; C$_6$F$_{13}$; CH(OCH$_2$CH$_2$O). B2 is a function that is derived from B1.

A function that is derived from B1 is understood to mean a function that is obtained by modification of the function B1 according to reactions known to a person skilled in the art.

The function B1 is advantageously the N(SiMe$_2$CH$_2$CH$_2$SiMe$_2$) group or the N(SiMe$_3$)$_2$ group. The function B2 is advantageously selected from the group consisting of amines, ammoniums and ketones. When B2 is an amine, it is typically obtained by deprotection of the N(SiMe$_2$CH$_2$CH$_2$SiMe$_2$) group or the N(SiMe$_3$)$_2$ group, optionally followed by an alkylation, according to reactions well known to a person skilled in the art. When B2 is an ammonium, it may be obtained by modification of the same N(SiMe$_2$CH$_2$CH$_2$SiMe$_2$) or N(SiMe$_3$)$_2$ groups, for example by quaternization reaction according to processes well known to a person skilled in the art. When B2 is a ketone, it is advantageously obtained by deprotection of the CH(OCH$_2$CH$_2$O) acetal function, a process that is also well known to person skilled in the art.

According to one preferred embodiment of the invention, B2 is a primary, secondary or tertiary amine, preferably a primary amine.

According to a specific embodiment of the invention, the function B is the function B1.

According to a variant of the invention, the copolymer bears a second function, function Z. The function Z is borne preferably on a chain end of the copolymer A. When the copolymer bears a function B and a function Z both at the chain end, the two functions are borne respectively by different ends: the copolymer is said to be telechelic or heterotelechelic in the particular case where Z is different from B.

According to any one of the embodiments of this variant, the function Z is preferably chosen from halogens, groups comprising an unsaturated carbon-carbon bond and functions containing a heteroatom selected from S, N, Si, O, B and P.

According to any one of the embodiments of the invention, the copolymer is preferentially linear.

The copolymer in accordance with embodiments of the invention may be prepared by the process described below.

The process for preparing the copolymer has the essential feature of comprising steps (a) and (b) and where appropriate (c) below:

(a) preparation of a compound of formula (II)

    (II)

wherein
  y is equal to 2 or 3;
  when y=2, the symbol Y is an alkaline-earth metal or zinc, and when y=3, Y is aluminium;
  d is an integer from 0 to 50, advantageously from 0 to 11;
  the symbol A representing the copolymer chain A described above;
  B1 is selected from the group consisting of N(SiMe$_3$)$_2$; N(SiMe$_2$CH$_2$CH$_2$SiMe$_2$); para-C$_6$H$_4$(NMe$_2$); para-C$_6$H$_4$(OMe); para-C$_6$H$_4$(N(SiMe$_3$)$_2$); ortho-CH$_2$—C$_6$H$_4$NMe$_2$; ortho-CH$_2$—C$_6$H$_4$OMe; C$_6$F$_5$; C$_3$F$_7$; C$_6$F$_{13}$; CH(OCH$_2$CH$_2$O), (b) a reaction for terminating the copolymer chain A,
(c) a reaction for modifying the function B1, in particular in order to form the function B2.

According to a variant of the process, step (b) is a reaction of the compound of formula (II) with a compound comprising an acidic proton, referred to as a stopper (or stopping agent). As stopper, mention may be made of water, carboxylic acids in particular $C_2$-$C_{18}$ fatty acids such as acetic acid or stearic acid, aliphatic or aromatic alcohols, such as methanol, ethanol or isopropanol, phenolic antioxidants, primary or secondary amines such as antioxidants comprising the diaminophenyl moiety. This variant of the process makes it possible to synthesize a copolymer comprising a monofunctional copolymer chain, since the copolymer chain A of the copolymer bears the function B1 at the end of the chain provided by step (a) of the process.

According to another variant of the invention, step (b) is a reaction of the compound of formula (II) with a functionalizing agent. The functionalization reaction involves the rupture of the bond formed by Y and the carbon both adjacent to Y and belonging to the copolymer chain A. The functionalizing agent is selected by a person skilled in the art for its reactivity with respect to this bond and for the chemical nature of the function Z that it bears. Step (b) then being a functionalization reaction, the process makes it possible to obtain, according to this other variant, a telechelic or heterotelechelic copolymer, since one end of the copolymer chain A bears the function B1 provided by step (a), and the other end the function Z provided by step (b).

Generally, the termination reaction is carried out by bringing the polymerization reaction medium into contact with a terminating agent, whether it is a stopper or a functionalizing agent, at a degree of conversion of the monomer selected by a person skilled in the art according to the desired macrostructure of the copolymer.

Step (c) is an optional step depending on whether or not it is desired to convert the function B1, in particular into the function B2. The embodiment of the process that comprises step (c) may be applied to the two variants of the process described above. In certain very particular embodiments, step (c) may be carried out simultaneously with step (b). As an example where steps (b) and (c) are concomitant, mention may be made of the case where step (b) is a reaction for termination by an acid compound and step (c) is a reaction for deprotection of the function B1 under acid conditions.

According to one particular embodiment of the invention, step (c) is a reaction for deprotection of the function B1 to give B2, carried out in an acid or basic medium depending on the chemical nature of the function B1 to be deprotected. For example, the trimethysilyl group that protects amine function may be hydrolysed in an acid or basic medium. The choice of the deprotection conditions is judiciously made by person skilled in the art taking into account the chemical structure of the substrate to be deprotected.

The copolymer prepared according to the process in accordance with embodiments of the invention may be separated from the reaction medium of step (b) or (c) according to processes well known to a person skilled in the art, for example by an operation for evaporating the solvent under reduced pressure or by a steam stripping operation.

Step (a) of the process in accordance with embodiments of the invention requires the preparation of the compound of formula (II). The compound of formula (II) may be prepared by the copolymerization of a monomer mixture containing the monomer M1 and the monomer M2 in the presence of a catalytic system comprising a transfer agent of formula (III) and a metallocene catalyst, $$Y((CH_2)_dB1)_y \qquad (III)$$

Y, B1, d and y being as defined above, in particular in the various embodiments of the invention described.

The copolymerization of a monomer mixture containing a conjugated diene and a monoolefin such as ethylene, an α-monoolefins or a mixture thereof may be carried out in accordance with patent applications EP 1 092 731, WO 2004035639, WO 2005028526, WO 2007054223 and WO 2007054224, knowing that the co-catalyst of the catalytic systems described in these documents is replaced in the present case by the transfer agent. Furthermore, a person skilled in the art adapts the polymerization conditions described in these documents so as to achieve the desired microstructure and macrostructure of the copolymer chain A. According to any one of the embodiments of the invention, the molar ratio of the transfer agent to the metal Met constituting the metallocene catalyst is preferably within a range extending from 1 to 100, more preferentially is greater than or equal to 1 and less than or equal to 10. The range of values extending from 1 to less than 10 is in particular more favourable for obtaining copolymers of high molar masses.

Furthermore, a person skilled in the art adapts the polymerization conditions and the concentrations of each of the reactants (constituents of the catalytic system, monomers, stopper) according to the equipment (tools, reactors) used for carrying out the polymerization and the various chemical reactions. As is known to a person skilled in the art, the copolymerization and the handling of the monomers, of the catalytic system and of the polymerization solvent(s) take place under anhydrous conditions and under an inert atmosphere. The polymerization solvents are typically aliphatic or aromatic hydrocarbon-based solvents.

The monomer M1 is preferably a monomer selected from the group consisting of 1,3-butadiene, isoprene and a mixture thereof, more preferentially is 1,3-butadiene.

The monomer M2 is preferably ethylene or mixture of ethylene and an α-monoolefin. As α-monoolefin, those mentioned previously are suitable, namely aliphatic or aromatic α-monoolefins, particularly aliphatic α-monoolefins preferably having 3 to 18 carbon atoms such as propene, 1-butene, 1-hexene, 1-octene, 1-hexadecene or mixtures thereof.

The transfer agent is preferably of formula (III-a) or (III-b), with d ranging from 1 to 11, preferably being equal to 3. The embodiment in which d is equal to 3 is advantageous in particular from the point of view of the accessibility of the transfer agent, since the reactant needed for the synthesis thereof is a commercial product or a product that is itself also readily accessible by synthesis.

$$Mg[(CH_2)_d-N(SiMe_2CH_2CH_2SiMe_2)]_2 \qquad (III\text{-}a)$$

$$Mg[(CH_2)_d-N(SiMe_3)_2]_2 \qquad (III\text{-}b)$$

When Y is an alkaline-earth metal or zinc, the transfer agent may be prepared by reaction of the metal, i.e. reactive, form of Y with a substrate or formula X—$(CH_2)_d$—B1, B1 and d being as defined above, X being a halogen, preferably a bromine atom.

When Y is Al, the transfer agent of formula (III) is preferably prepared by reaction of $AlCl_3$ with a derivative of a compound of formula X—$(CH_2)_d$—B1 described above, it being possible for this derivative to be an ionic salt based on lithium or potassium, for example of respective formula $Li(CH_2)_d$—B1 or $K(CH_2)_d$—B1 or the complex form thereof with a solvent, as is well known in organometallic compounds based on lithium or potassium.

The transfer agent is typically synthesized under operating conditions generally used in the synthesis of organometallic compounds, that is to say under anhydrous conditions and under an inert atmosphere, in ether solvents, by a controlled addition of a solution of the substrate, such as a dropwise addition, to the reactant in suspension in the solvent. The recovery of the transfer agent is carried out in a manner known per se, for example by evaporation of the synthesis solvent or by recrystallisation in a solvent or mixture of solvents.

According to a first variant of the process, the metallocene catalyst is a metallocene comprising the moiety of formula (IV-1):

Met being a group 4 metal atom or a rare-earth metal atom, $Cp^1$ and $Cp^2$, which are identical or different, being selected from the group consisting of cyclopentadienyl groups, indenyl groups and fluorenyl groups, it being possible for the groups to be substituted or unsubstituted, P being a group that bridges the two $Cp^1$ and $Cp^2$ groups, and that comprises at least one silicon or carbon atom.

In the formula (IV-1), the Met atom is connected to a ligand molecule consisting of the two $Cp^1$ and $Cp^2$ groups connected together by the bridge P.

According to a second variant of the process, the metallocene catalyst is a metallocene comprising the moiety of formula (IV-2):

Met being a group 4 metal atom or a rare-earth metal atom, $Cp^1$ and $Cp^2$, which are identical or different, being selected from the group consisting of cyclopentadienyl groups, indenyl groups and fluorenyl groups, it being possible for the groups to be substituted or unsubstituted, P being a group that bridges the two $Cp^1$ and $Cp^2$ groups, and that comprises at least one silicon or carbon atom.

In the formula (IV-1), the Met atom is connected to a ligand molecule consisting of the two $Cp^1$ and $Cp^2$ groups connected together by the bridge P.

According to a second variant of the process, the metallocene catalyst is a metallocene comprising the moiety of formula (IV-2):

Met being a group 4 metal atom or a rare-earth metal atom, $Cp^1$ and $Cp^2$, which are identical or different, being selected from the group consisting of cyclopentadienyl groups, indenyl groups and fluorenyl groups, it being possible for the groups to be substituted or unsubstituted.

It should be remembered that rare-earth elements are metals and denote the elements scandium, yttrium and the lanthanides, the atomic number of which ranges from 57 to 71.

By way of substituted cyclopentadienyl, fluorenyl and indenyl groups, mention may be made of those which are substituted with alkyl radicals having 1 to 6 carbon atoms or with aryl radicals having 6 to 12 carbon atoms. The choice of the radicals is also guided by the accessibility to the corresponding molecules, which are the substituted cyclopentadienes, fluorenes and indenes, because the latter are commercially available or can be easily synthesized.

In the case of a bridged metallocene of formula (IV-1), mention may particularly be made, as substituted cyclopentadienyl group, of those substituted in position 2 or 3, such as the tetramethylcyclopentadienyl, 3-trimethylsilylcyclopentadienyl groups. Position 2 (or 5) denotes the position of the carbon atom which is adjacent to the carbon atom to which the bridge P is attached, as is represented in the diagram below.

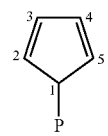

In the case of a bridged metallocene of formula (IV-1), mention may particularly be made, as indenyl group substituted in position 2, of those substituted in position 2, such as the 2-methylindenyl, 2-phenylindenyl groups. Position 2 denotes the position of the carbon atom which is adjacent to the carbon atom to which the bridge P is attached, as is represented in the diagram below.

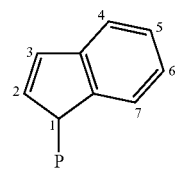

In the case of a bridged metallocene of formula (IV-1), mention may more particularly be made, as substituted fluorenyl groups, of the 2,7-di(tert-butyl)fluorenyl and 3,6-di(tert-butyl)fluorenyl groups. Positions 2, 3, 6 and 7 respectively denote the positions of the carbon atoms of the rings as represented in the diagram below, position 9 corresponding to the carbon atom to which the bridge P is attached.

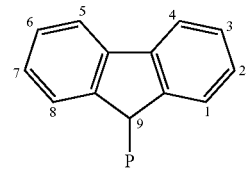

In the case of unbridged metallocene of formula (IV-2), mention may be made, as substituted cyclopentadienyl group, of the 3-trimethylsilylcyclopentadienyl, tetramethylcyclopentadienyl groups; mention may be made, as substituted indenyl group, of the methylindenyl, phenylindenyl groups; mention may be made, as substituted fluorenyl groups, of the 2,7-di(tert-butyl)fluorenyl and 3,6-di(tert-butyl)fluorenyl groups.

Advantageously, whether the metallocene is of formula (IV-1) or (IV-2), $Cp^1$ represents a substituted or unsubstituted cyclopentadienyl group and $Cp^2$ represents a substituted or unsubstituted fluorenyl group. Better still, $Cp^1$ represents an unsubstituted cyclopentadienyl group and $Cp^2$ represents an unsubstituted flourenyl group.

Preferably, the symbol P, denoted under the term bridge, corresponds to the formula $MR^1R^2$, M representing a silicon or carbon atom, preferably a silicon atom, $R^1$ and $R^2$, which are identical or different, representing an alkyl group comprising from 1 to 20 carbon atoms. More preferentially, the P bridge is of formula $SiR^1R^2$, $R^1$ and $R^2$ being as defined above. More preferentially still, it corresponds to the formula $SiMe_2$.

Whether the metallocene is of formula (IV-1) or (IV-2), the symbol Met preferably represents a rare-earth metal atom, more preferentially a lanthanide (Ln) atom, the atomic number of which ranges from 57 to 71, more preferentially still a neodymium (Nd) atom.

According to one preferred embodiment of the invention, the metallocene catalyst is a formula (IV-1a) or (IV-2b):

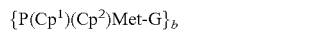  (IV-1a)

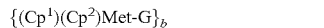  (IV-2b)

wherein:
Met represents a rare-earth metal atom,
the symbol G denoting a halogen X selected from the group consisting of chlorine, fluorine, bromine and iodine or a group comprising the $BH_4$ borohydride moiety,
P, $Cp^1$ and $Cp^2$ being as defined above,
b being equal to 1 or 2.

Whether the metallocene is of formula (IV-1a) or (IV-2b), the symbol Met preferably represents a lanthanide (Ln) atom, the atomic number of which ranges from 57 to 71, more preferentially a neodymium (Nd) atom.

The metallocene can be in the form of a crystalline or non-crystalline powder, or else in the form of single crystals. The metallocene may be in a monomer or dimer form, these forms depending on the method of preparation of the metallocene, as is for example described in applications WO 2007/054223 and WO 2007/054224. The metallocene may be prepared conventionally by a process analogous to that described in documents EP 1 092 731, WO 2007/054223 and WO 2007/054224, in particular by reaction, under inert and anhydrous conditions, of the salt of an alkali metal of the ligand with a rare-earth metal salt, such as a rare-earth metal halide or borohydride, or a salt of a group 4 metal in a suitable solvent, such as an ether, for instance diethyl ether or tetrahydrofuran, or any other solvent known to a person skilled in the art. After reaction, the metallocene is separated from the reaction by-products by the techniques known to a person skilled in the art, such as filtration or precipitation from a second solvent. In the end, the metallocene is dried and isolated in the solid form.

Advantageously, whether the metallocene is of formula (IV-1a) or (IV-2b), $Cp^1$ represents a substituted or unsubstituted cyclopentadienyl group and $Cp^2$ represents a substituted or unsubstituted fluorenyl group. Better still, $Cp^1$ represents an unsubstituted cyclopentadienyl group and $Cp^2$ represents and unsubstituted fluorenyl group. The unsubstituted fluorenyl group is of formula $C_{13}H_8$.

According to any one of the embodiments described, the metallocene catalyst is preferably a lanthanide borohydride metallocene or a lanthanide halide metallocene, in particular a lanthanide chloride metallocene.

According to one particularly preferred embodiment of the invention, the symbol G denotes chlorine or the group of formula (IV):

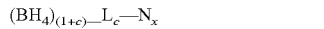  (IV)

wherein
L represents an alkali metal selected from the group consisting of lithium, sodium and potassium,
N represents a molecule of an ether,
x, which may or may not be an integer, is equal to or greater than 0,
c, an integer, is equal to or greater than 0.

Any ether which has the ability to complex the alkali metal, in particular diethyl ether and tetrahydrofuran, is suitable as ether.

More preferentially, the metallocene catalyst is of formula (IV-3a) or (IV-3b) or (IV-3c).

  (IV-3a)

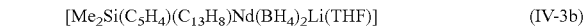  (IV-3b)

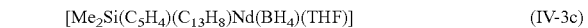  (IV-3c)

Thus, the use of the transfer agent, another subject of the invention, makes it possible to obtain the copolymers in accordance with the invention, whether they are monofunctional at the chain end or telechelic. Such copolymers correspond in particular to the following formulae (V) and (VI):

  (V)

  (VI)

H representing a hydrogen atom;
A representing the copolymer chain as defined above according to any one of the embodiments of the invention;
B and d being as defined above according to any one of the embodiments of the invention.

Another subject of the invention is the compound of formula (II), the preparation of which is required in step (a) of the process in accordance with the invention,

  (II)

y being equal to 2 or 3;
when y=2, the symbol Y being an alkaline-earth metal or zinc, and when y=3, Y being aluminium;
d being an integer from 0 to 50, advantageously from 0 to 11;
the symbol A representing the copolymer chain A defined according to any one of the embodiments described,
B1 being selected from the group consisting of $N(SiMe_3)_2$; $N(SiMe_2CH_2CH_2SiMe_2)$; para-$C_6H_4(NMe_2)$; para-$C_6H_4(OMe)$; para-$C_6H_4(N(SiMe_3)_2)$; ortho-$CH_2$—$C_6H_4NMe_2$; ortho-$CH_2$—$C_6H_4OMe$; $C_6F_5$; $C_3F_7$; $C_6F_{13}$; $CH(OCH_2CH_2O)$).

More particularly, the compound of formula (II) is such that Y is Mg, B1 represents the $N(SiMe_2CH_2CH_2SiMe_2)$ group or the $N(SiMe_3)_2$ group and d ranges from 1 to 11 or equal to 3.

The copolymer in accordance with embodiments of the invention, in particular when it is an elastomer, may be used in a rubber composition, in particular in a semi-finished product for a tire.

The rubber composition in accordance with embodiments of the invention may contain, in addition to the copolymer, any ingredient conventionally used in a rubber composition for a tire, such as for example a reinforcing filler such as a carbon black or a silica, a plasticizing system, a crosslinking system, in particular a vulcanization system, and one or more antioxidants.

The abovementioned characteristics of the present invention, and also others, will be better understood on reading the following description of several exemplary embodiments of the invention, given by way of illustration and without limitation.

EXEMPLARY EMBODIMENTS

II.1-Characterization Methods:

Size Exclusion Chromatography (SEC):

SEC analyses were carried out at high temperature (HT-SEC) using a Viscotek apparatus (Malvern Instruments) fitted with 3 columns (PLgel Olexis 300 mm×7 mm I. D., Agilent Technologies) and 3 detectors (refractometer, viscometer and light scattering). 200 µl of a solution of the sample at a concentration of 5 mg.ml$^{-1}$ were eluted in 1,2,4-trichlorobenzene using a flow rate of 1 ml.min$^{-1}$ at 150° C. The mobile phase was stabilized with 2,6-di(tert-butyl)-4-methylphenol (200 mg.l$^{-1}$). The OmniSEC software was used to acquire and analyse the data. The number-average molar masses Mn and the polydispersity index Đ were calculated by universal calibration using polystyrene standards.

Nuclear Magnetic Resonance (NMR):

High-resolution NMR spectroscopy was carried out on a Bruker DRX 400 spectrometer operating at 400 MHz for proton NMR and 101 MHz for carbon 13 NMR. The acquisitions were carried out at 363K using a 5 mm QNP probe for $^1$H NMR and a PSEX 10 mm probe for $^{13}$C NMR. The samples were analysed at a concentration of 5-15% by weight. A mixture of tetrachloroethylene (TCE) and deuterated benzene ($C_6D_6$) (2/1 v/v) was used as solvent. The chemical shifts are given in units of ppm, relative to tetramethoxysilane as internal reference for $^1$H NMR and to the methylene signal at 30 ppm of the sequence of ethylene units for $^{13}$C NMR.

The microstructure of the ethylene/butadiene copolymers is determined by $^{13}$C NMR according to the method described in *Macromolecules* 2001, 34, 6304-6311.

II.2-Example of the Preparation of a Transfer Agent:

Example 1:

preparation of the transfer agent MgR$_2$ (R=1-propyl-2,2,5,5-tetramethyl-1-aza-2,5-disilacyclopentane, corresponding to the formula —(CH$_2$)$_3$—N(SiMe$_2$CH$_2$CH$_2$SiMe$_2$)).

2.6 g (2 equivalents) of magnesium, then 50 ml of dry THF are introduced into a 100 ml round-bottomed flask under an inert argon atmosphere.

Next, 13.3 ml (15 g, 1 equivalent) of 1-(3-bromopropyl)-2,2,5,5-tetramethyl-1-aza-2,5-disilacyclopentane are added dropwise and at room temperature.

The solution of magnesium 1-(3-bromopropyl)-2,2,5,5-tetramethyl-1-aza-2,5-disilacyclopentane is then recovered by pipe transfer of this solution into a Schlenk tube under argon, in order to remove the unreacted magnesium.

5.5 ml (1.2 equivalents) of dioxane are added to this solution in order to shift the Schlenk equilibrium to form the compound MgR$_2$ (R=1-propyl-2,2,5,5-tetramethyl-1-aza-2,5-disilacyclopentane) and to precipitate MgBr$_2$.

This solution is then filtered over celite under argon, in order to recover MgR$_2$ in solution in THF. 100 ml of Bu$_2$O are added to this solution and the THF is distilled under vacuum at room temperature.

Thus, a solution of MgR$_2$ in Bu$_2$O is obtained.

II.2-Examples of the Preparation of Monofunctional Copolymers, Involving a Termination Step (b) by Reaction with a Compound Comprising an Acidic Proton and Concomitantly a Step (c) of Modifying the Function:

Example 2:

8.5 ml (1.96 mmol) of MgR$_2$ (0.23 M in dibutyl ether) prepared according to Example 1 are introduced into a round-bottomed flask containing 200 ml of dry toluene.

The solution is transferred, under argon atmosphere, into a 250 ml reactor.

Next, a solution of 31.3 mg of [Me$_2$SiFlu$_2$Nd(BH$_4$)$_2$Li(THF)] complex (Nd=49 µmol; Mg/Nd=40) is transferred.

The argon is removed under vacuum and the reactor is pressurized to 4 bar by means of a gaseous mixture of ethylene/1,3-butadiene monomer having a constant composition (5 mol % of 1,3-butadiene) at 70° C.

The reactor is degassed after 2 h of polymerization and the temperature is brought to 20° C.

The polymerization medium is poured into a 1 M methanol/HCl solution and is stirred for 1 hour.

The precipitated polymer is dissolved in toluene then is precipitated from a methanol solution in order to thus be washed. The polymer is finally dried.

23.6 g of copolymer bearing, at the end of the copolymer chain, the function NH$_3$Cl attached to the chain by means of the —(CH$_2$)$_3$— group are recovered.

The number-average molar mass is determined by HT-SEC analysis, 150° C.: $M_n$=9085 g.mol$^{-1}$, Đ=2.18.

The proton NMR spectrum (2/1 v/v TCE/C$_6$D$_6$, 400 MHz, 363K) shows the characteristic signal of the methylene in α position of the ammonium at δ=2.68 ppm (broad, —CH$_2$—NH$_3$Cl) and the characteristic signal of the protons of the ammonium at δ=8.59 ppm (broad, —NH$_3$Cl).

The composition of the copolymer is 95.6 mol % ethylene. The 1,3-butadiene is inserted containing 24.7 mol % of 1,4-trans, 11.0 mol % of 1,2 and 64.3 mol % in the form of rings.

Example 3:

The same procedure as Example 2 is followed for the synthesis of this copolymer, but with a monomer mixture containing 20 mol % of 1,3-butadiene.

7.3 g of copolymer bearing, at the end of the copolymer chain, the function NH$_3$Cl attached to the chain by means of the —(CH$_2$)$_3$— group are recovered.

The number-average molar mass is determined by HT-SEC analysis, 150° C.: $M_n$=6800 g.mol$^{-1}$, Đ=2.07.

The proton NMR spectrum (2/1 v/v TCE/C$_6$D$_6$, 400 MHz, 363K) shows the characteristic signal of the methylene in α position of the ammonium at δ=2.68 ppm (broad, —CH$_2$—NH$_3$Cl) and the characteristic signal of the protons of the ammonium at δ=8.62 ppm (broad, —NH$_3$Cl).

The composition of the copolymer is 80.0 mol % ethylene. The 1,3-butadiene is inserted containing 19.0 mol % of 1,4-trans, 44.5 mol % of 1,2 and 36.5 mol % in the form of rings.

Example 4:

The same procedure as Example 2 is followed for the synthesis of this copolymer, but 2.2 ml (0.51 mmol) of MgR$_2$ (0.23 M in dibutyl ether) per 31.3 mg of [Me$_2$SiFlu$_2$Nd(BH$_4$)$_2$Li(THF)] complex (Nd=49 µmol; Mg/Nd=10.3) are introduced and a monomer mixture containing 20 mol % of 1,3-butadiene is used.

16.8 g of copolymer bearing, at the end of the copolymer chain, the function NH$_3$Cl attached to the chain by means of the —(CH$_2$)$_3$— group are recovered.

The number-average molar mass is determined by HT-SEC analysis, 150° C.: $M_n$=25 220 g.mol$^{-1}$, Đ=2.2.

The proton NMR spectrum (2/1 v/v TCE/C$_6$D$_6$, 400 MHz, 363K) shows the characteristic signal of the methylene in α position of the ammonium at δ=2.68 ppm (broad, —CH$_2$—NH$_3$Cl) and the characteristic signal of the protons of the ammonium at δ=8.62 ppm (broad, —NH$_3$Cl).

The composition of the copolymer is 80.1 mol % ethylene. The 1,3-butadiene is inserted containing 17.5 mol % of 1,4-trans, 45.2 mol % of 1,2 and 37.3 mol % in the form of rings.

Example 5:

The same procedure as Example 4 is followed for the synthesis of this copolymer, but the polymerization this time lasts 4 h.

27.6 g of copolymer bearing, at the end of the copolymer chain, the function $NH_3Cl$ attached to the chain by means of the $—(CH_2)_3—$ group are recovered.

The number-average molar mass is determined by HT-SEC analysis, 150° C.: $M_n$=39 730 g.mol$^{-1}$, Đ=2.3.

The proton NMR spectrum (2/1 v/v TCE/$C_6D_6$, 400 MHz, 363K) makes it possible to observe the methylene in α position of the ammonium at δ=2.68 ppm (broad, $—CH_2—NH_3Cl$).

The composition of the copolymer is 79.3 mol % ethylene. The 1,3-butadiene is inserted containing 28.1 mol % of 1,4-trans, 38.7 mol % of 1,2 and 33.2 mol % in the form of rings.

Example 6:

The same procedure as Example 2 is followed for the synthesis of this copolymer, but with a monomer mixture containing 30 mol % of 1,3-butadiene.

7.3 g of copolymer bearing, at the end of the copolymer chain, the function $NH_3Cl$ attached to the chain by means of the $—(CH_2)_3—$ group are recovered.

The proton NMR spectrum (2/1 v/v TCE/$C_6D_6$, 400 MHz, 363K) shows the characteristic signal of the methylene in α position of the ammonium at δ=2.68 ppm (broad, $—CH_2—NH_3Cl$) and the characteristic signal of the protons of the ammonium at δ=8.59 ppm (broad, $—NH_3Cl$).

The composition of the copolymer is 75.3 mol % ethylene. The 1,3-butadiene is inserted containing 25.7 mol % of 1,4-trans, 44.2 mol % of 1,2 and 30.1 mol % in the form of rings.

Example 7:

Introduced into a round-bottomed flask containing 200 ml of dry toluene are 1.24 ml (284 μmol) of $MgR_2$ (0.23 M in dibutyl ether) prepared according to Example 1. The solution is transferred under an argon atmosphere into a 250 ml reactor. Next, a solution containing 30.7 mg of [Me$_2$Si(C$_5$H$_4$)(C$_{13}$H$_8$)Nd(BH$_4$)$_2$Li(THF)] complex (Nd=57 μmol; Mg/Nd=5) is transferred.

The argon is removed under vacuum and the reactor is pressurized to 4 bar by means of a gaseous mixture of ethylene/1,3-butadiene monomer having a constant composition (20 mol % of 1,3-butadiene) at 80° C. The reactor is degassed after 90 minutes of polymerization and the temperature is brought to 20° C. The polymerization medium is poured into a 1 M methanol/HCl solution and is stirred for 1 hour. The precipitated polymer is re-dissolved in toluene, then is precipitated from a methanol solution in order to thus be washed. The polymer is finally dried.

9.89 g of copolymer bearing, at the end of the chain, an $—NH_3Cl$ function (or function in $—NH_2$ form) attached to the chain by means of the $—(CH_2)_3—$ group is recovered. The proton NMR spectrum (2/1 v/v TCE/$C_6D_6$, 400 MHz, 363K) shows the characteristic signal of the methylene in α position of the amine at δ=2.53 ppm (broad, $—CH_2—NH_2$) and that of the methylene in α position of the ammonium at δ=2.68 ppm (broad, $—CH_2—NH_3Cl$). The composition of the copolymer is 67.6 mol % ethylene and 32.4 mol % butadiene. The 1,3-butadiene is inserted in two forms, 97.4 mol % of 1,4-trans moieties and 2.6 mol % of 1,2 units.

II.3-Examples of the Preparation of Monofunctional Copolymers, Involving a Step (c) of Modifying the Function:

Example 8, Step (c) being a Hydrolysis Reaction in a Basic Medium:

A fraction of the polymer from Example 2 is withdrawn (10 g). The polymer is dissolved in toluene then is precipitated using a methanol/NaOH solution (1 M) and is stirred for 1 hour at room temperature.

The polymer is recovered then washed with methanol and dried under vacuum at 60° C. 8.2 g of copolymer bearing, at the end of the copolymer chain, the function $NH_2$ attached to the chain by means of the $—(CH_2)_3—$ group are recovered.

The proton NMR spectrum (2/1 v/v TCE/$C_6D_6$, 400 MHz, 363K) shows the disappearance of the characteristic signals of the ammonium at δ=2.68 ppm (broad, $—CH_2—NH_3Cl$) and δ=8.59 ppm, (broad, $—NH_3Cl$) in favour of the characteristic signal of the methylene in α position of the amine at δ=2.53 ppm (broad, $—CH_2—NH_2$).

Example 9, Step (c) being a Hydrolysis Reaction in a Basic Medium:

A fraction of the polymer from Example 3 is withdrawn (8 g). The polymer is dissolved in toluene then is precipitated using a methanol/NaOH solution (1 M) and is stirred for 1 hour at room temperature.

The polymer is recovered then washed with methanol and dried under vacuum at 60° C. 7.8 g of copolymer bearing, at the end of the copolymer chain, the function $NH_2$ attached to the chain by means of the $—(CH_2)_3—$ group are recovered.

The proton NMR spectrum (2/1 v/v TCE/$C_6D_6$, 400 MHz, 363K) shows the disappearance of the characteristic signals of the ammonium at δ=2.68 ppm (broad, $—CH_2—NH_3Cl$) and δ=8.62 ppm, (broad, $—NH_3Cl$) in favour of the characteristic signal of the methylene in α position of the amine at δ=2.53 ppm (broad, $—CH_2—NH_2$).

Example 10, Step (c) being a Hydrolysis Reaction in a Basic Medium:

A fraction of the polymer from Example 4 is withdrawn (7 g). The polymer is dissolved in toluene then is precipitated using a methanol/NaOH solution (1 M) and is stirred for 1 hour at room temperature.

The polymer is recovered then washed with methanol and dried under vacuum at 60° C. 5.3 g of copolymer bearing, at the end of the copolymer chain, the function $NH_2$ attached to the chain by means of the $—(CH_2)_3—$ group are recovered.

Example 11, Step (c) being a Hydrolysis Reaction in a Basic Medium:

A fraction of the polymer from Example 5 is withdrawn (13 g). The polymer is dissolved in toluene then is precipitated using a methanol/NaOH solution (1 M) and is stirred for 1 hour at room temperature.

The polymer is recovered then washed with methanol and dried under vacuum at 60° C. 12.0 g of copolymer bearing, at the end of the copolymer chain, the function $NH_2$ attached to the chain by means of the $—(CH_2)_3—$ group are recovered.

The proton NMR spectrum (2/1 v/v TCE/$C_6D_6$, 400 MHz, 363K) shows the disappearance of the characteristic signal of the ammonium observed at δ=2.68 ppm (broad, $—CH_2—NH_3Cl$) in favour of the characteristic signal of the methylene in α position of the amine at δ=2.53 ppm (broad, $—CH_2—NH_2$).

Example 12, step (c) being a Hydrolysis Reaction in a Basic Medium:

A fraction of the polymer from Example 6 is withdrawn (3 g). The polymer is dissolved in toluene then is precipitated using a methanol/NaOH solution (1 M) and is stirred for 1 hour at room temperature.

The polymer is recovered then washed with methanol and dried under vacuum at 60° C. 2.5 g of copolymer bearing, at the end of the copolymer chain, the function $NH_2$ attached to the chain by means of the —$(CH_2)_3$— group are recovered.

The proton NMR spectrum (2/1 v/v TCE/$C_6D_6$, 400 MHz, 363K) shows the disappearance of the characteristic signals of the ammonium at $\delta=2.68$ ppm (broad, —$CH_2$—$NH_3Cl$) and $\delta=8.59$ ppm, (broad, —$NH_3Cl$) in favour of the characteristic signal of the methylene in $\alpha$ position of the amine at $\delta=2.53$ ppm (broad, —$CH_2$—$NH_2$).

II.4-Example of the Preparation of a Telechelic Copolymer, Involving a Termination Step (b) by Reaction with a Functionalizing Agent:

Example 13:

Preparation of A telechelic EBR, Z-EBR-$(CH_2)_3$—B (with Z=I; B=$NH_3Cl$) with a Feed Containing 20 mol % of 1,3-butadiene 8.5 ml (1.96 mmol) of $MgR_2$ (0.23 M in dibutyl ether) prepared according to Example 1 are introduced into a round-bottomed flask containing 200 ml of dry toluene.

The solution is transferred, under argon atmosphere, into a 250 ml reactor.

Next, a solution of 31.3 mg of $[Me_2SiFlu_2Nd(BH_4)_2Li(THF)]$ complex is transferred. (Nd=49 μmol; Mg/Nd=40).

The argon is removed under vacuum and the reactor is pressurized to 4 bar by means of a gaseous mixture of ethylene/1,3-butadiene monomer having a constant composition (20 mol % of 1,3-butadiene) at 70° C.

The reactor is degassed after 2 h of polymerization and the temperature of the reaction medium is maintained at 70° C.

In order to have a reference copolymer before the reaction with the functionalizing agent, in this particular case the monofunctional copolymer, 100 ml of the reaction medium are then withdrawn. This withdrawal is poured into a 1 M methanol/HCl solution and stirred for 1 hour. The precipitated reference polymer is dissolved in toluene then is precipitated from a methanol solution in order to thus be washed.

The polymer is finally dried.

7.4 g of copolymer bearing, at the end of the copolymer chain, the function $NH_3Cl$ attached to the chain by means of the —$(CH_2)_3$— group are recovered.

The proton NMR spectrum (2/1 v/v TCE/$C_6D_6$, 400 MHz, 363K) shows the characteristic signal of the methylene in $\alpha$ position of the ammonium at $\delta=2.68$ ppm (broad, —$CH_2$—$NH_3Cl$) and the characteristic signal of the protons of the ammonium at $\delta=8.58$ ppm (broad, —$NH_3Cl$). The composition of the reference copolymer is 80.8 mol % ethylene. The 1,3-butadiene is inserted containing 18.7 mol % of 1,4-trans, 39.9 mol % of 1,2 and 41.4 mol % in the form of rings.

A solution of 3.8 g of iodine (15 mmol) in THF (I/Mg mole ratio=15) is added to the reaction medium and the mixture is stirred for 2 hours at 70° C.

The temperature is bought to 20° C. The polymerization medium is poured into a 1 M methanol/HCl solution and is stirred for 1 hour.

The precipitated polymer is dissolved in toluene then is precipitated from a methanol solution in order to thus be washed.

The polymer is finally dried.

6.3 g of copolymer bearing, at one chain end, the function $NH_3Cl$ attached to the chain by means of the —$(CH_2)_3$— group and, at the other chain end, the function I, are recovered.

The proton NMR spectrum (2/1 v/v TCE/$C_6D_6$, 400 MHz, 363K) shows the characteristic signal of the methylene in $\alpha$ position of the ammonium at $\delta=2.68$ ppm (broad, —$CH_2$—$NH_3Cl$) and the characteristic signal of the protons of the ammonium at $\delta=8.52$ ppm (broad, —$NH_3Cl$), but also the characteristic signal of methylenes in $\alpha$ position of an iodo group at $\delta=2.94$ ppm (multiplet, —$CH_2$-I).

The invention claimed is:

1. A process for preparing a copolymer comprising a copolymer chain A, which process comprises step (a), step (b) and optionally step (c) below:
    (a) preparation of a compound of formula (II)

$$Y(A-(CH_2)_d-B1)_y \qquad (II)$$

wherein
    y is equal to 2 or 3;
    when y=2, the symbol Y is an alkaline-earth metal or zinc, and when y=3, Y is aluminium;
    d is an integer from 0 to 50;
    the symbol A representing a copolymer chain A comprising monomer units M1 and monomer units M2, M1 being a conjugated diene and M2 being a monomer selected from the group consisting of $\alpha$-monoolefins, ethylene and mixtures thereof;
    B1 is selected from the group consisting of $N(SiMe_3)_2$; $N(SiMe_2CH_2CH_2SiMe_2)$; para-$C_6H_4(NMe_2)$; para-$C_6H_4(OMe)$; para-$C_6H_4(N(SiMe_3)_2)$; ortho-$CH_2$—$C_6H_4NMe_2$; ortho-$CH_2$-$C_6H_4OMe$; $C_6F_5$; $C_3F_7$; $C_6F_{13}$; $CH(OCH_2CH_2O)$,
    (b) a reaction for terminating the copolymer chain A,
    (c) a reaction for modifying the function B1, and
wherein the compound of formula (II) is prepared by the copolymerization of a monomer mixture containing the monomer M1 and the monomer M2 in the presence of a catalytic system comprising a transfer agent of formula (III) and a metallocene catalyst comprising the moiety of formula (IV-1) or (IV-2)

$$Y((CH_2)_dB1)_y \qquad (III)$$

$$P(Cp^1)(Cp^2)Met \qquad (IV-1)$$

$$(Cp^1)(Cp^2)Met \qquad (IV-2)$$

Met being a group 4 metal atom or a rare-earth metal atom,
    P being a group that bridges the two $Cp^1$ and $Cp^2$ groups, and that comprises at least one silicon or carbon atom,
    y is equal to 2 or 3;
    when y=2, the symbol Y is an alkaline-earth metal or zinc, and when y=3, Y is aluminium;
    d is an integer from 0 to 50;
    B1 is selected from the group consisting of $N(SiMe_3)_2$; $N(SiMe_2CH_2CH_2SiMe_2)$; para-$C_6H_4(NMe_2)$; para-$C_6H_4(OMe)$; para-$C_6H_4(N(SiMe_3)_2)$; ortho-$CH_2$—$C_6H_4NMe_2$; ortho-$CH_2$—$C_6H_4OMe$; $C_6F_5$; $C_3F_7$; $C_6F_{13}$; $CH(OCH_2CH_2O)$;
    $Cp^1$ and $Cp^2$, which are identical or different, being selected from the group consisting of cyclopentadienyl groups, indenyl groups and fluorenyl groups, it being possible for the groups to be substituted or unsubstituted.

2. A process according to claim 1, wherein M1 is a monomer selected from the group consisting of 1,3-butadiene, isoprene and a mixture thereof.

3. A process according to claim 1, wherein M2 is ethylene or a mixture of ethylene and an α-monoolefin.

4. A process according to claim 1, wherein the transfer agent is of formula (III-a) or (III-b), with d ranging from 1 to 11:

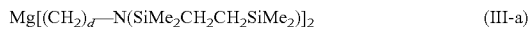  (III-a)

  (III-b).

5. A process according to claim 4, wherein d is equal to 3.

6. A process according to claim 1, wherein Met represents a rare-earth metal atom.

7. A process according to claim 1, wherein the metallocene catalyst is of formula (IV-1a) or (IV-2b):

  (IV-1a)

  (IV-2b)

the symbol G denoting a halogen X selected from the group consisting of chlorine, fluorine, bromine and iodine or a group comprising the $BH_4$ borohydride moiety, P being a group that bridges the two $Cp^1$ and $Cp^2$ groups, and that comprises at least one silicon or carbon atom, $Cp^1$ and $Cp^2$, which are identical or different, being selected from the group consisting of cyclopentadienyl groups, indenyl groups and fluorenyl groups, it being possible for the groups to be substituted or unsubstituted, Met being a rare-earth metal atom,
b being equal to 1 or 2.

8. A process according to claim 7, wherein the symbol G denotes chlorine or the group of formula (IV):

  (IV)

wherein
L represents an alkali metal selected from the group consisting of lithium, sodium and potassium,
N represents a molecule of an ether,
x, which may or may not be an integer, is equal to or greater than 0,
c, an integer, is equal to or greater than 0.

9. A process according to claim 1, wherein P corresponds to the formula $MR^1R^2$, M representing a silicon or carbon atom, $R^1$ and $R^2$, which are identical or different, representing an alkyl group comprising from 1 to 20 carbon atoms.

10. A process according to claim 9, wherein M is Si and $R^1$ and $R^2$ each denote a methyl group.

11. A process according to claim 1, wherein $Cp^1$ represents a substituted or unsubstituted cyclopentadienyl group and $Cp^2$ represents a substituted or unsubstituted fluorenyl group.

12. A process according to claim 1, wherein the metallocene catalyst is of formula (IV-3a), (IV-3b) or (IV-3c)

  (IV-3a)

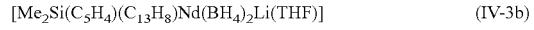  (IV-3b)

  (IV-3c).

13. A process according to claim 1, wherein step (b) is a reaction of the compound of formula (II) with a compound comprising an acidic proton or with a functionalizing agent.

* * * * *